(12) United States Patent
Henderson et al.

(10) Patent No.: US 10,133,991 B2
(45) Date of Patent: Nov. 20, 2018

(54) SYSTEM AND METHOD FOR EFFICIENT TRAVEL TIME AND ROUTE COMPUTATION

(71) Applicant: ServiceNow, Inc., Santa Clara, CA (US)

(72) Inventors: Lisa Henderson, Temecula, CA (US); Bryan Boyle, San Deigo, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 15/843,980

(22) Filed: Dec. 15, 2017

(65) Prior Publication Data

US 2018/0107954 A1    Apr. 19, 2018

Related U.S. Application Data

(63) Continuation of application No. 14/489,563, filed on Sep. 18, 2014, now Pat. No. 9,911,087.

(51) Int. Cl.
*G06Q 10/04* (2012.01)
*G01C 21/34* (2006.01)
*G06Q 10/08* (2012.01)

(52) U.S. Cl.
CPC ......... *G06Q 10/047* (2013.01); *G01C 21/343* (2013.01); *G01C 21/3492* (2013.01); *G06Q 10/04* (2013.01); *G06Q 10/08* (2013.01)

(58) Field of Classification Search
None
See application file for complete search history.

(56) References Cited

U.S. PATENT DOCUMENTS

| | | | |
|---|---|---|---|
| 6,701,299 B2 | 3/2004 | Kraisser et al. | |
| 7,251,612 B1 | 7/2007 | Parker et al. | |
| 7,603,285 B2 | 10/2009 | Jacobs et al. | |
| 7,793,294 B2 | 9/2010 | Haeri | |
| 2007/0150375 A1* | 6/2007 | Yang | G06Q 10/08 705/339 |
| 2008/0086455 A1* | 4/2008 | Meisels | G01C 21/26 |
| 2008/0114638 A1 | 5/2008 | Colliau | |
| 2010/0250384 A1* | 9/2010 | Bhargava | G01C 21/343 705/26.1 |
| 2011/0022428 A1 | 1/2011 | Parker | |
| 2013/0261956 A1 | 10/2013 | Marks | |
| 2014/0046585 A1 | 2/2014 | Morris et al. | |
| 2014/0278074 A1* | 9/2014 | Annapureddy | G01C 21/3453 701/468 |

FOREIGN PATENT DOCUMENTS

WO    2001069488 A    9/2001

* cited by examiner

*Primary Examiner* — Tamara L Weber
(74) *Attorney, Agent, or Firm* — Fletcher Yoder PC (57) ABSTRACT

A system and method efficiently computes travel times between an origin and destination, minimizing expensive calls to a third party service by first geographically expanding both origin and destination and then searching a cache of previously computed or obtained travel times for any route satisfying the expanded origin and destination. A further embodiment concerns a system and method to prepare an optimized routing sequence to travel to a set of geographical task sites, in satisfaction of applicable conditions for one or more of the task sites. Advantageously, optimized routing may employ the disclosed method of computing travel times between origin and destination.

17 Claims, 6 Drawing Sheets

SYSTEM AND METHOD FOR EFFICIENT TRAVEL TIME AND ROUTE COMPUTATION

CROSS-REFERENCE TO RELATED APPLICATION

This application is a continuation of U.S. patent application Ser. No. 14/489,563, entitled "SYSTEM AND METHOD FOR EFFICIENT TRAVEL TIME AND ROUTE COMPUTATION," filed on Sep. 18, 2014, which is herein incorporated by reference in its entirety.

TECHNICAL FIELD

The present disclosure is generally related to multi-stop travel routing and in particular to a computer-implemented method, system, and apparatus to optimize travel routing among multiple stops in satisfaction of applicable conditions.

BACKGROUND

Many business today perform on-site deliveries and conduct on-site services. In addition to corporate parcel delivery companies and the United States Postal Service, many companies perform on-site service calls such as product installation, delivery, and repair. For these entities, the efficient planning of travel times is essential.

SUMMARY

Broadly, the present disclosure concerns an efficient system and method to compute travel times between an origin and destination, minimizing expensive calls to a third party service by first geographically expanding both origin and destination and then searching a cache of previously computed or obtained travel times for any travel path between the expanded origin and destination. A further embodiment concerns a system and method to prepare an optimized routing sequence to travel to a set of geographical task sites, in satisfaction of applicable conditions for one or more of the task sites. Advantageously, optimized routing may employ the disclosed method of computing travel times between origin and destination.

The present disclosure may be implemented in the form of a computer-implemented method or one or more systems, apparatuses, circuits, programmed product, or other forms.

BRIEF DESCRIPTION OF THE DRAWINGS

The description herein makes reference to the accompanying drawings wherein like reference numerals refer to like parts throughout the several views.

DETAILED DESCRIPTION

The nature, objectives, and advantages of the invention will become more apparent to those skilled in the art after considering the following detailed description in connection with the accompanying drawings.

1. Hardware Components and Interconnections

A. Overall System Architecture

One aspect of the present disclosure concerns a digital data processing system configured to perform various tasks in conjunction with computing travel time between various sites. The hardware components and interconnections are described as follows, whereas the functionality of the system is separately discussed further below.

Figure 1:
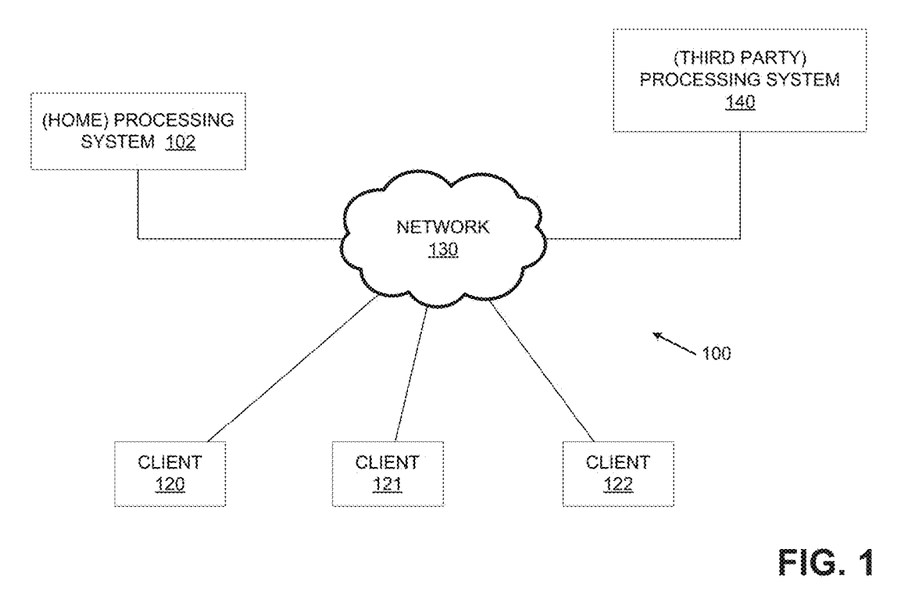
FIG. 1 is a block diagram showing an exemplary computing environment.

As shown in FIG. 1, the overall system 100 includes a processing system 102, another processing system 140, and multiple clients 120-122. These components are interconnected by one or more networks 130, with one example being the public Internet. Other examples of the network 130 include a local area network, wide area network, Intranet, Extranet, Internetwork, Wi-Fi network, or any other suitable technology using wires, radiofrequency, microwave, satellite, cellular, optical, or other telecommunications. For mere convenience and without any intended limitation, the system 102 is referred to as the "home" processing system because many of the operations discussed herein occur in the system 102. In one example, the home system 102 comprises a server farm with suitable computational power and communications to support the functionality described herein.

For convenience and without any intended limitation, the processing system 140 is referred to as a "third party" processing system to emphasize the exemplary configuration where the system 140 is physically and geographically distinct from the system 102 and indeed operated by a different entity than the system 102. In one example, the system 140 may also comprise a server farm of suitable computational power and communications to support the functionality described herein. In one example, the third party system 140 may comprise computing equipment running a service such as GOOGLE™ maps, MapQuest™, BING™ maps, YAHOO!™ maps, and such.

The clients 120-122 comprise client computing machines such as laptop computers, desktop machines, workstations, personal data assistants, smart phones, or any other conceivable user computing device capable of performing the functionality described herein.

In one exemplary configuration described in greater detail below, the home system 102 is a client to the third party system 140, in that the home system 102 obtains certain data services from the third party system 140. Although the clients 120-122 may incidentally receive services from the third party processing system 140 unrelated to the details of this disclosure, the exemplary configuration described below focuses on the clients 120-122 receiving data and computational services rendered by the home processing system 102.

B. Cloud Computing Generally

In one example, the illustrated system may employ one or more components that employ cloud computing. For example, the home processing system 102 may provide cloud computing services to its clients 120-122, and likewise the third party processing system 140 may provide cloud computing services to the home processing system 102. In this sense, the home processing system 102 concurrently acts as a cloud computing provider (in relation to the clients 120-122) and a cloud computing client (in relation to the system 140).

Cloud computing may provide various advantages over traditional computing models, including the ability to allocate shared resources amongst many different customers. Under traditional computing models, computing resources are typically allocated to a single customer or entity and substantial portions of those resources may remain unused or underused.

Computing resources of cloud computing infrastructure may be allocated, for example, using a multi-tenant or a single-tenant architecture. Under a multi-tenant architecture, installations or instantiations of application, database, and/or other software application servers may be shared among multiple customers. For example, a single web server (such as a unitary Apache installation), application server (such as a unitary Java Virtual Machine) and/or a single database server catalog (such as a unitary My SQL catalog) may handle requests from multiple customers. In a multi-tenant architecture, data or applications used by various customers may be commingled or shared. In an implementation of this architecture, the application and/or database server software may distinguish between and segregate data and other information of the various customers using the system. For example, database records belonging to a particular customer may be identified using a customer_id field in a database table holding records for numerous customers.

Under a single-tenant infrastructure, separate web servers, application servers, and/or database servers are created for each customer. In other words, each customer will access its dedicated web server(s), will have its transactions processed using its dedicated application server(s), and will have its data stored in its dedicated database server(s) and or catalog(s). In a single-tenant architecture, physical hardware servers may be shared such that multiple installations or instantiations of web, application, and/or database servers may be installed on the same physical server. Each installation may be allocated a certain portion of the physical server resources, such as RAM, storage, and CPU cycles.

In an exemplary implementation, a customer instance is composed of four web server instances, four application server instances, and two database server instances. As previously described, each of these server instances may be located on different physical servers and each of these server instances may share resources of the different physical servers with a number of other server instances associated with other customer instances. The web, application, and database servers of the customer instance may be allocated to two different datacenters to facilitate high availability of the applications and data provided by the servers. There may be a primary pair of web servers and application servers in a first datacenter and a backup pair of web servers and application servers in a second datacenter. There may be a primary database server in the first datacenter and a second database server in the second datacenter. The primary database server may replicate data to the secondary database server. The cloud computing infrastructure may be configured to direct traffic to the primary pair of web servers which may be configured to utilize the primary pair of application servers and primary database server respectively. In a failure scenario, the secondary servers may be converted to primary servers.

The application servers may include a platform application, such as one written in Java, for example, that provides generic platform functionality for accessing the database servers, integrating with external applications, and rendering web pages and other content to be transmitted to clients. The generic platform functionality may be configured with metadata stored in the database server. In other words, the operation of the platform on the application server may be customized by certain end-users of the platform without requiring the Java code of the platform application to be changed. The database server instances may be configured with a database configuration and schema to facilitate the operation of the platform. For example, the database server instance may be configured with various tables for storing metadata about applications, tables/fields, menus, forms, business rules, scripts, and custom UI elements that are used to customize the appearance and operation of the customer instance. In some implementations, the application servers may include web server functionality and the web servers may be omitted.

In an alternative implementation, a customer instance may include only two application servers and one database server. In a given cloud infrastructure system, different implementations of customer instances may be used for different customer instances at the same time. Other configurations and implementations of customer instances may also be used.

C. Cloud Computing System Example

Figure 2:
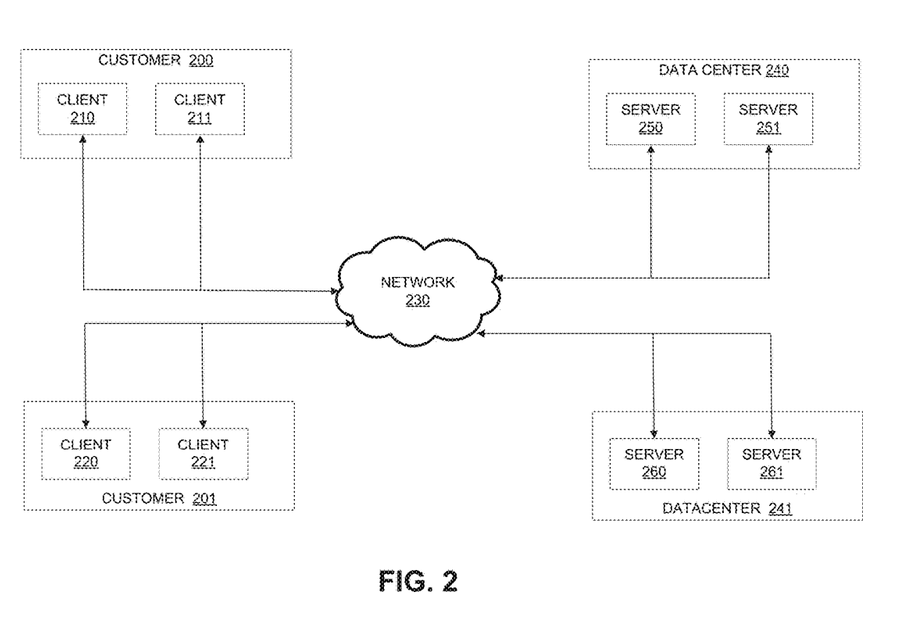
FIG. 2 is a block diagram of an exemplary cloud computing system.

FIG. 2 depicts an exemplary cloud computing system. The exemplary cloud computing system includes two customers 200 and 201. Each customer may have clients, such as clients 210, 211 for customer 200 and clients 220, 221 for customer 201. Each of the clients 210, 211, 220, 221 may be in the form of a computing system including multiple computing devices, or in the form of a single computing device, for example, a mobile phone, a tablet computer, a laptop computer, a notebook computer, a desktop computer, and the like. The customers and clients shown are exemplary, and a cloud computing system may have a different number of customers or clients or may have a different configuration of customers or clients. For example, there may be hundreds or thousands of customers and each customer may have any number of clients.

The exemplary cloud computing system includes two datacenters 240 and 241. Each datacenter includes servers, such as servers 250, 251 for datacenter 240 and servers 260, 261 for datacenter 241. Each datacenter may represent a different location where servers are located, such as a datacenter facility in San Jose, Calif. or Amsterdam, Netherlands. Each of the servers 250, 251, 260, 261 may be in the form of a computing system including multiple computing devices, or in the form of a single computing device, for example, a desktop computer, a server computer and the like. The datacenters and servers shown are exemplary, and a cloud computing system may have a different number of datacenters and servers or may have a different configuration of datacenters and servers. For example, there may be tens of data centers and each data center may have hundreds or any number of servers.

The exemplary clients 210, 211, 220, 221 and servers 250, 251, 260, 261 are connected to a network 230. The clients for a particular customer may connect to the network 230 via a common connection point or different connection points. The network 230 can, for example, be the Internet. The network 230 may also be or include a local area network, wide area network, virtual private network, or any other means of transferring data between any of the clients 210, 211, 220, 221 and servers 250, 251, 260, 261. The network 230, datacenters 240, 241, and/or blocks not shown may include network hardware such as routers, switches, load balancers, and/or other network devices. For example, each of the datacenters 240, 241 may have one or more load balancers for routing traffic from the network 230 to various servers such as the servers 250, 251, 260, 261.

Other implementations of the exemplary cloud computing system are also possible. For example, devices other than the clients and servers shown may be included in the system. In an implementation, one or more additional servers may operate as a cloud infrastructure control, from which servers and/or clients of the cloud infrastructure are monitored, controlled, and/or configured. For example, some or all of the techniques described herein may operate on said cloud infrastructure control servers. Alternatively or in addition, some or all of the techniques described herein may operate on servers such as servers 250, 251, 260, 261.

D. Implementation of Data Processing Entities

There are various data processing components in the illustrated systems, such as the system 102, system 140, clients 120-122, customers 200-201, data centers 240-241, servers 250-251, servers 260-261, and the like. Furthermore, other components of the disclosed systems may include smart features, and in this respect, these components may include data processing features. In any of these cases, such data processing features may be implemented by one or more instances of hardware, software, firmware, or a subcomponent or combination of the foregoing. The makeup of these subcomponents is described in greater detail below, with reference to FIGS. 3-5.

E. Exemplary Digital Data Processing Apparatus

Figure 3:
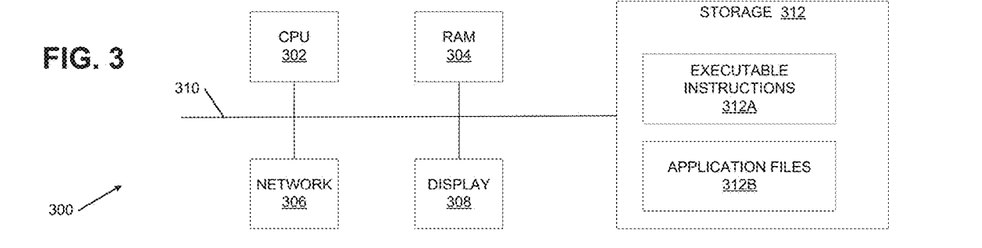
FIG. 3 is a block diagram of an example internal configuration of a digital data processing machine.
Figure 4:
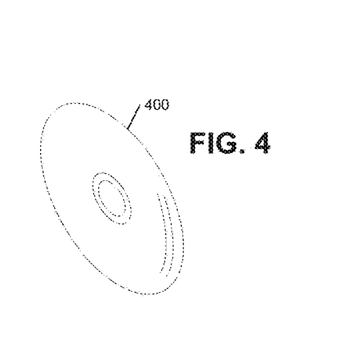
FIG. 4 is a perspective view of an exemplary digital data storage.

As mentioned above, the various data processing entities of FIGS. 1-2 may be implemented in different ways. FIG. 3 shows one example, in the form of a digital data processing apparatus 300. More particularly, FIG. 3 illustrates a block diagram of an exemplary internal configuration of a digital data processing machine 300. The machine 300 may be implemented by one or more computing devices such as a mobile phone, a tablet computer, laptop computer, notebook computer, desktop computer, server computer, mainframe computer, computer workstation, and the like.

The exemplary machine 300 includes a CPU 302, RAM 304, storage 312, network 306, display 308, and bus 310. One example of the CPU 302 is a conventional central processing unit. The CPU 302 may include single or multiple processors each having single or multiple processing cores. Alternatively, CPU 302 may include another type of device, or multiple devices, capable of manipulating or processing information now-existing or hereafter developed.

The RAM 304 may be Random Access Memory or any other suitable type of storage device. The RAM 304 may include executable instructions and data for immediate access by CPU 302. The RAM 304 may include one or more DRAM modules such as DDR SDRAM. Alternatively, the RAM 304 may include another type of device, or multiple devices, capable of storing data for processing by CPU 302 now-existing or hereafter developed. The CPU 302 may access and manipulate data in RAM 304 via bus 310.

The storage 312 may include executable instructions 312a and application files 312b along with other data. The executable instructions 312a may include, for example, an operating system and one or more application programs for loading in whole or part into the RAM 304 to be executed by the CPU 302. The operating system may be, for example, Windows, Mac OS X, Linux, or another operating system suitable to the details of this disclosure. The application program may include, for example, a web browser, web server, and/or database server. The application files 312b can, for example, include user files, database catalogs, and configuration information. Storage 312 may comprise one or multiple devices and may utilize one or more types of storage, such as solid state or magnetic.

The internal configuration may also include one or more input/output devices, such as the network 306 and the display 308. The network 306 and display 308 may be coupled to the CPU 302 via the bus 310, in one example. The network 306 may, for example, provide a network interface and may take the form of a wired network interface such as Ethernet or a wireless network interface. Other output devices that permit a user to program or otherwise use the client or server may be provided in addition to or as an alternative to the display 308. When the output device is or includes a display, the display may be implemented in various ways, including by a LCD, CRT, LED, OLED, etc.

Other implementations of the internal architecture of clients and servers are also possible. For example, servers may omit the display 308 as well as client programs such as web browsers. Operations of the CPU 302 may be distributed across multiple machines which may be coupled directly or across a local area or other network. The RAM 304 or storage 312 may be distributed across multiple machines such as network-based memory or memory in multiple machines performing the operations of clients or servers. Although depicted here as a single bus, the bus 208 may be composed of multiple buses.

F. Storage Media

As mentioned above, various instances of digital data storage may be used, for example, to provide storage used by the systems of FIG. 1 and/or FIG. 2, to embody the storage 312 or RAM 304, etc. Depending upon its application, this digital data storage may be used for various functions, such as storing data and/or storing machine-readable instructions. These instructions may themselves aid in carrying out various processing functions, or they may serve to install a software program upon a computer, where such software program is thereafter executable to perform other functions related to this disclosure.

In any case, the storage media may be implemented by nearly any mechanism to digitally store machine-readable signals. One example is optical storage such as CD-ROM, WORM, DVD, digital optical tape, disk storage 400 (FIG. 4), or other optical storage. Another example is direct access storage, such as a conventional "hard drive", redundant array of inexpensive disks (RAID), or another direct access storage device (DASD). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor may read information from, and write information to, the storage medium. In the alternative, the storage medium may be integral to the processor. In another example, the processor and the storage medium may reside in an ASIC or other integrated circuit.

G. Logic Circuitry

Figure 5:
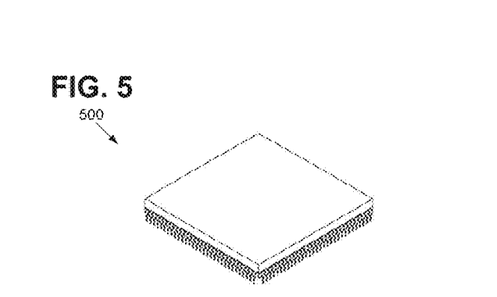
FIG. 5 is a perspective view of an exemplary logic circuit.

In contrast to storage media that contain machine-executable instructions, as described above, a different embodiment uses logic circuitry to implement some or all of the processing features described herein. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, transistors, and the like), field programmable gate array (FPGA), programmable logic array (PLA), programmable logic device (PLD), and the like. FIG. 5 shows an example of logic circuitry in the form of an integrated circuit 500.

2. Operation

Having described the structural features of the present disclosure, the operational aspect of the disclosure will now be described. The steps of any method, process, or algorithm described in connection with the embodiments disclosed herein may be embodied directly in hardware, firmware, software executed by hardware, circuitry, or a combination of these.

A. Routing between Coordinates

Figure 6:
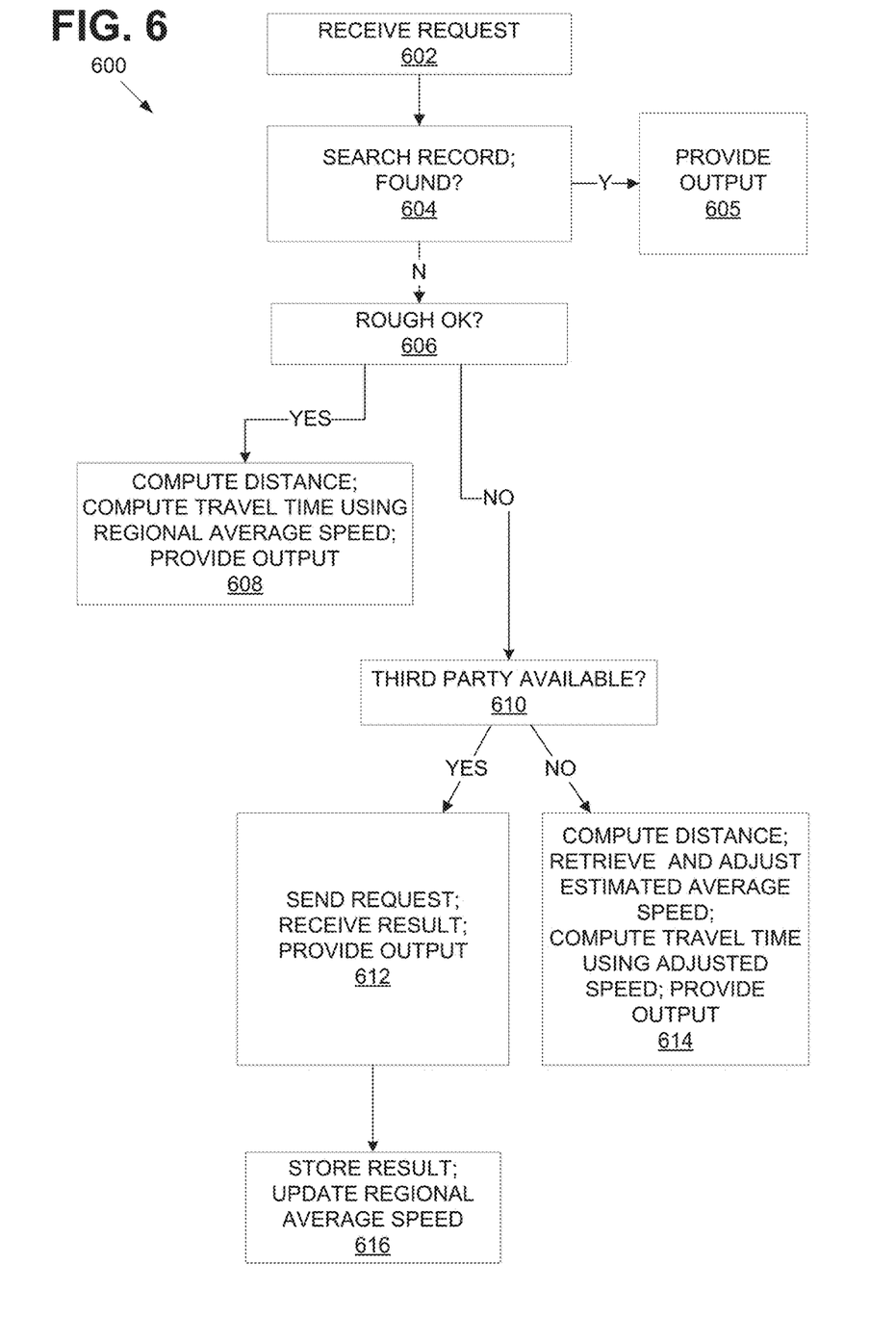
FIG. 6 is a flow chart of exemplary operations to compute travel time between coordinates.

FIG. 6 shows a sequence 600 to illustrate one implementation of the method aspect of this disclosure. Broadly, this sequence serves to compute travel time between geographical sites. For ease of explanation, but without any intended limitation, the example of FIG. 6 is described in the specific context of FIG. 8, which depicts the relationship between the home processing system 802, third party processing system 808, client 812, tasks 804, and task sites 814 in one implementation. Also shown in FIG. 8, the home processing system 802 contains a cache 802a. The cache 802a comprises any suitable manner of volatile or nonvolatile digital data storage, and as discussed in greater detail below, the cache 802a functions to store travel times that have been obtained from the system 808 along with the corresponding origin and destination coordinates. Systems 802, 808 and client 812 can each be implemented as a computing device such as digital data processing apparatus 300.

Figure 8:
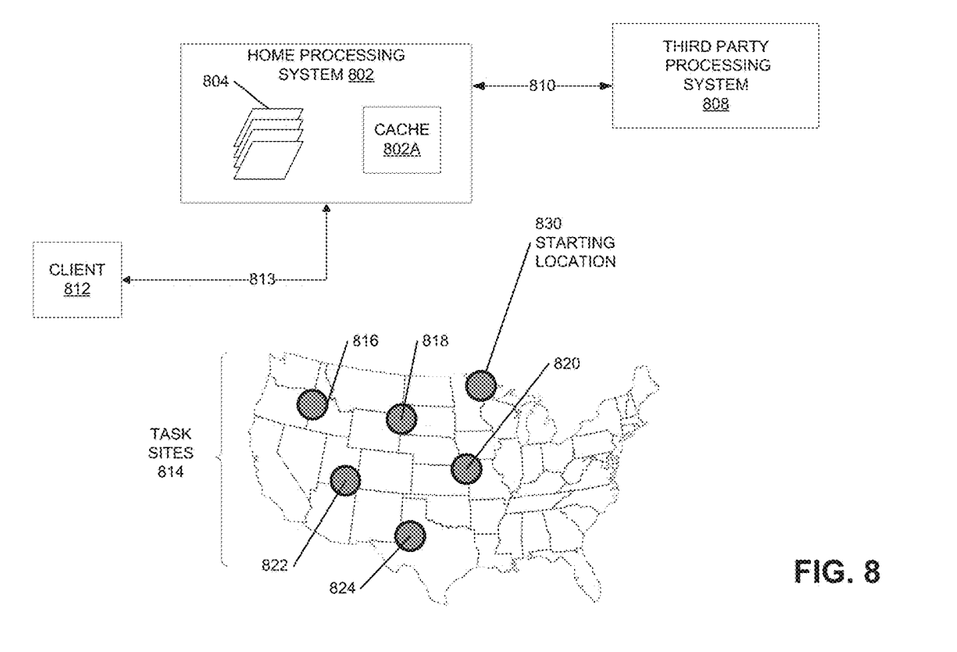
FIG. 8 is a block diagram illustrating an exemplary operational interrelationship between tasks, task sites, home and third party processing systems, and a client.

In step 602, the system 802 receives (via 813) a request to compute travel time between origin and destination coordinates, which may also be called locations. In this example, the coordinates are geographic locations, described by latitude and longitude, although any other suitable system for describing geographical locations may be used such as UTM, UPS, and the like. The request may originate from the client 812 or virtually any other source, but in the presently described embodiment, the request comes from an optimization routine (described below) which runs on the home processing system 802 as discussed in greater detail below.

In step 604, the system 802 searches the cache 802a for the origin and destination coordinates to see if the cache contains a previously computed or obtained travel time for these coordinates. According to an optional enhancement, prior to executing the search 604, the origin and/or destination coordinates may be reduced in precision in order to broaden the search. For example, the origin and/or destination coordinates may be rounded to a given number of decimal places. As a more specific example, latitude and longitude coordinates may be reduced to three decimal places. This reduction in precision recognizes that travel times might not be appreciably different if computed based on an apartment in the same building as the origin/destination coordinate, or a home across the street, or a building one block away.

If records in the cache 802a are order-specific as to origin and destination, then step 604 also conducts a second search, reversing the order of the origin coordinate and the destination coordinate.

If the search from 604 yielded a stored travel time, the system 802 outputs the found travel time in step 605. The output may occur in the form of displaying the output on the display 308 or other machine-driven screen such as a computer monitor, sending the output in machine-readable form to a process that called the sequence 600, transmitting a machine-readable signal representing the output to the client 120-122 or 812 or other requestor, or providing another suitable output form.

However, if the search 604 failed to find a relevant stored travel time, then the system 802 checks whether a so-called "rough estimate" (described below) is acceptable. Acceptability may be determined by presence or absence of any condition or state, without limitation. However, in the context of the presently described example, the issue of whether a rough estimate is acceptable is specified by the calling process that invokes the sequence 600. This is described further below, in conjunction with the sequence 700 of FIG. 7.

The use of "route estimates" in step 606, and also the use of the cache 802a in step 604, can save on cost and improve performance by helping to reduce requests to the third party processing system 808. In some scenarios, such requests constitute API calls, and API calls to the system 808 can trigger financial charges to the requestor under some circumstances. Performance can be improved by eliminating the delay intrinsic in the performance of such requests.

If step 606 answers YES, then step 608 computes a straight line distance between the origin and destination coordinates. This distance may be computed, for example, by applying a mathematical formula to the latitudes and longitudes. Then, also in step 608, the system 802 computes the travel time between origin and destination coordinates using a predetermined "regional average speed." The regional average speed is a straight line speed calculated by computing a running average of straight line speeds calculated from the travel times that the system 802 obtains from the third party processing system 808, and the straight line distances calculated by the system 802 over time. In one example, in order to increase the relevance of the regional average speed, there may be multiple different regional average speeds, regionalized according to city, neighborhood, metro area, highway, or other geographical area or division. Step 608 employs the regional average speed of the sector most appropriate to the origin and/or destination coordinates. Furthermore, regional average speeds may be limited to data of a prescribed recency.

Also in step 608, the system 802 provides an output of the computed travel time. The output of step 608 may be supplied in the same manner as the output of step 605, described above.

In contrast to the foregoing description, step 608 is not performed if step 606 finds that a "rough estimate" is not acceptable. In this case, step 606 answers NO and proceeds to step 610. Here, the system 802 asks whether the third party processing system 808 is available. In the present example, which concerns computing travel times between geographic coordinates, the system 808 may comprise a service such as GOOGLE™ maps, MapQuest™, BING™ maps, YAHOO!™ maps, and such. "Availability" of the third party service may be determined according to various criteria, such as whether the third party service is on-line, whether the system 802 presently has Internet connectivity, whether the system 802 or client 812 has remaining credits or funds at the third party service, whether a given subscription to services of the system 808 is intact, whether the system 802 or client 812 has reached a self-imposed monthly or other period limit for invoking third party services, or other examples. For example, access to the third party service may be facilitated by an application programming interface provided by the third party. Access to the third party service can be, for example, controlled using a unique key assigned to a particular entity. For example, system 802 can provide the ability for a user of the system to enter a unique key or use a default unique key provided by system 802. Costs associated with using the third party system can be assessed by the third party to the entity associated with the unique key used to access the third party system.

If step 610 deems the third party service available, step 610 answers YES, and the system 802 in step 612 sends (via 810) the third party system 808 a request to compute a travel time for the origin and destination coordinates. After the system 802 receives a result from the third party service 808, the system 802 then provides an output of the result. The output may be provided in the same manner as steps 605 and 608, described above. Step 612 also stores the travel times and associated coordinates in the cache 802a. After step 612, the system 802 proceeds to step 616, where it employs the travel time and distance from the third party system 808 to update and store the regional average speed.

In contrast to the foregoing description, steps 612 and 616 are not performed if step 610 found the third party service 808 to be unavailable. In this case, step 610 answers NO and the system 802 performs step 614. Here, the system manually computes the distance between origin and destination coordinates instead of using the third party service. This distance may be computed, for example, by applying a mathematical formula to the latitudes and longitudes to compute a "straight line" distance. Then, also in step 614, the system 802 computes the travel time between origin and destination coordinates using an "estimated average speed." The estimated average speed is a predetermined speed, such as 20 mph, which the system 802 adjusts according to trip distance. For example, the system (still in step 614) may increase the estimated average speed by fifty percent for trips longer than twenty miles, and decrease the estimated average speed by fifty percent for trips shorter than twenty miles. Thus, for a trip of thirty miles, the system would use an estimated average speed of 30 mph. Of course, other baseline speeds and adjustment factors may be used or and even refined over time, as appropriate.

With the adjusted estimated average speed in hand, the system 802 (still in step 614) uses this speed along with the computed distance to compute a travel time between origin and destination coordinates. Then, the system 802 completes step 614 by providing an output of the computed travel time. This output may be rendered in the same manner, for example, as the outputs provided in steps 605, 608, and/or 612.

Upon completing steps 608, 616, or 614, the sequence 600 is finished, and the system 802 awaits another request, which will start the process again in step 602.

B. Optimizing Routing

Figure 7:
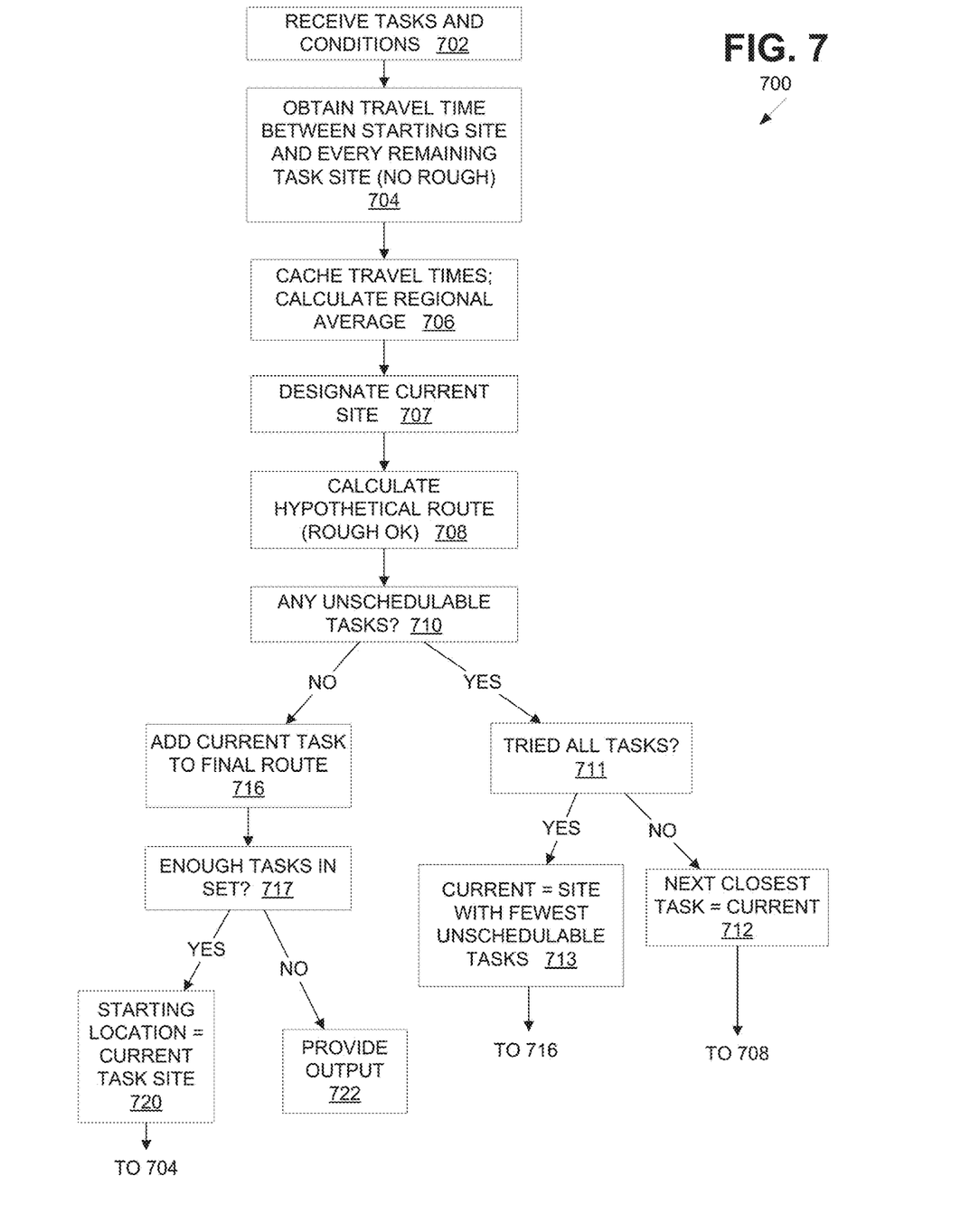
FIG. 7 is a flow chart of exemplary operations to prepare an optimized routing sequence for a set of tasks.

FIG. 7 shows a sequence 700 to illustrate a different implementation of the method aspect of this disclosure. Broadly, this sequence serves to compute an optimized route between various geographic task sites. For ease of explanation, but without any intended limitation, the example of FIG. 7 is described in the specific context of FIG. 8, which functionally depicts the relationship between the home processing system 802, third party processing system 808, client 812, tasks 804, and task sites 814.

The steps 700 are initiated in step 702, when the home processing system 802 receives, computes, generates, assembles, or otherwise obtains a set of tasks 804. In one example, an exemplary client 812 machine or operator automatically or manually submits the tasks 804 to the system 802. Alternatively, the system 802 may generate the tasks based on data describing the client 812's operations, based on an accumulation of service calls received or generated at the system 802, or based on other data or metadata retrieved from (or submitted by) one or more clients such as 812.

Each task describes an operation to be completed, and is associated with a task site. The task sites are geographical locations where the tasks are to be performed. In the present example, task sites are described in terms of latitude and longitude, although any suitable coordinate system may be used in practice. Each task may also be associated with one or more conditions applicable to that task. Some examples of applicable conditions include a window of time within which a task must be completed, and an order of completing one task relative to another task.

In one example, the sequence 700 is performed by a business providing information technology products and services. In this context, some exemplary tasks might include delivering a component such as a laptop computer, picking up a component for repair, repairing a client's computer, installing a network, reconfiguring an installation, and the like.

A starting location 830 is illustrated, which is not one of the task sites in this example, although it could be a task site in another implementation. The starting location 830 may comprise a home location of the entity that operates the system 802, a fleet parking area, a location of last task completed, a home of a service technician that takes a fleet vehicle home daily, or another appropriate location.

In step 704, the system 802 determines a travel time between the starting location 830 and each of the task sites 814. This includes travel times between: the starting location 830 and the task site 816, the starting location 830 and the task site 818, the starting location 830 and the task site 820, and so on. The depicted task sites are exemplary only and are not to scale. Task sites can include any location and in an implementation, task sites can for example be constrained to a particular city, county, state, or other geographical region. This initial operation avoids "rough estimates" in accordance with step 606 of FIG. 6. Therefore, the travel times are computed in accordance with steps 610 and 612 or 614 from FIG. 6.

Step 706 is performed in order to (1) store the travel times of step 704 in the cache 802a, and (2) compute or update a regional average speed based on these travel times. If the travel times of step 704 were not obtained from the third party service, then step 706 is skipped in one exemplary implementation. In this case, the regional average speed will be the stored regional average speed that has been prepared and stored over time because of previous instances of step 704, in accordance with step 616 (FIG. 6). In one example, the regional average speed for a given route is based exclusively upon the travel times obtained for that route in step 704, to ensure greatest temporal and geographic relevancy.

In step 707, the system 802 designates one of the task sites 814 as a "current" task site. In the present example, the first current task site is selected to be the task site that is geographically nearest to the first starting location. As discussed below, the starting location can change over various iterations of the sequence 700, so hence the reference to a "first" starting location.

Next, in step 708, the system 802 prepares a single virtual route proceeding in series from the current task site to each of the remaining task sites. In this example, the system 802 establishes the virtual route by sorting any task sites with time window conditions according to window end time, where tasks with chronologically earlier window times occur earlier and tasks with chronologically later window times occur later. Task sites without any conditions can be placed anywhere in the virtual route, grouped at the end of the route, or treated in another way. In one specific implementation of step 708, the virtual route is computed by always placing the tasks without any applicable conditions at the end of the route. In an alternative, these tasks are omitted from step 708, and when the final optimized route (minus the tasks without any applicable conditions) is determined, then, these tasks are added by repeating step 708 as needed. A different option, instead of re-performing step 708, is to add the remaining no-condition tasks by computing every possible route among the no-condition tasks, and selecting the route with the least overall travel time.

Also in step 708, the system 802 calculates travel times between task sites over the single virtual route being analyzed. In this operation, "rough estimates" are acceptable, so this is carried out with step 608 from FIG. 6, using the regional average speed.

Next, in step 710 the system 802 asks whether the current virtual route resulted in any unschedulable tasks, considering the order and travel times of the tasks. For example, an unschedulable task might include a task that could not be conducted in its applicable time window. If step 710 answers NO, then step 716 is performed as discussed in greater detail below.

If task 710 answer YES, then step 710 proceeds to step 711. Step 711 asks whether steps 708 and 710 have been performed using all remaining task sites of the task set 804 as the "current" task site. If step 711 answers NO, then step 711 proceeds to step 712. Here, the system 802 designates a different task site as the current task and returns to step 708. For example, step 712 may designate the next-nearest task site to the starting location 830 as the "current" task. During the first iteration of performing step 712, this is the second-nearest task site, and then if task 710 answers YES and task 711 answers NO, the third-nearest task, then fourth-nearest, and so on. After step 712, step 708 computes a new hypothetical route, using the current task as designated in step 712.

Whenever step 711 answers YES, however, then step 711 proceeds to step 713. Here, the system 802 identifies the task site that, when selected as the "current" site, resulted in the hypothetical route with the least number of unschedulable tasks under the computation of step 708.

Next, step 713 advances to step 716, where the current task is added to the final optimized route. In essence, step 716 fixes the order that the current task will be performed relative to other tasks in the final, optimized route. In other words, the ultimate order of performing tasks in the optimized route is determined by the order of which tasks are added in step 716.

After step 716, step 717 asks whether there are two or more tasks remaining in the current task set, which has been reduced by any tasks removed in accordance with step 720, as discussed below. If so, then step 717 advances to step 720, which sets the starting location as the current task, and removes the current task from the set of input tasks 804. After step 720, the process 700 returns to step 704, which functions as described above, except that the current task from the last performance of step 716 is removed from the task set 804 and this task becomes the starting location. At this point, the input task set is now reduced by all tasks having been added in step 716. The next ensuing of the sequence 700 will determine the next task to be performed in the optimized route, and so on.

In contrast to the foregoing description, whenever step 717 finds that the task set only contains two tasks, then the calculation of hypothetical routes is finished. Step 722 then provides a final output. This output may comprise an ordered listing of tasks or task sites. For instance, the final route may be embodied by a listing of tasks added in step 716. The order of these tasks is the same chronological order in which the individual tasks were added in step 716. As an optional enhancement, step 722 may send a request to the third party processing system 808 to obtain step by step driving instructions, distances, travel times, or other information along the optimized route, and namely, from the starting location to each of the task sites in the order calculated by the optimized routing.

The output of step 722 may occur in the form of displaying the output on a machine-driven screen such as a computer monitor, sending the output to a process that called the sequence 600, transmitting the output to the client 812 or other requestor, sending an email or graphic or other report of the optimized route, displaying the optimized route on a web page or smart phone application, or providing another suitable output form. Alternatively, the output of 722 can include an error in the event that an optimized route could not be generated for the provided tasks. With the conclusion of step 722, the sequence 800 ends.

3. Other Embodiments

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC 112, sixth paragraph, unless the element is expressly recited using the phrase "means for" or, in the case of a method claim, the phrase "step for."

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

This specification has been set forth with various headings and subheadings. These are included to enhance readability and ease the process of finding and referencing material in the specification. These heading and subheadings are not intended, and should not be used, to affect the interpretation of the claims or limit claim scope in any way.

What is claimed is:

1. A system, comprising:
a non-transitory memory; and
one or more hardware processors configured to read instructions from the non-transitory memory to perform operations comprising:
determining a starting location, wherein the starting location comprises a location of a completed task;
receiving a request to compute a travel route between the starting location and a set of task sites, the set of task sites comprising a first task site and a second task site;
searching for previously cached travel times between the starting location and the set of task sites, wherein the previously cached travel times were previously obtained from a request, sent via network communications using an application programming interface, to a third party service to calculate the respective travel times between the starting location, the first task site, and the second task site;
expanding a search for previously cached travel times by truncating a longitude and a latitude for geographical locations associated with the starting location and the set of task sites before searching for the previously cached travel times between the starting location and the set of task sites;
generating the travel route based on a minimization of a total travel time of respective travel times between the starting location and the first task site, between the starting location and the second task site, and between the first task site and the second task site; and
transmitting the travel route to a requestor.

2. The system of claim 1, wherein the completed task comprises a delivery of a component, an acquirement of the component, an installation of a network, a reconfiguration of the network, or any combination thereof.

3. The system of claim 1, wherein the travel route comprises driving instructions between the starting location and the set of task sites, distances between the starting location and the set of task sites, travel times between the starting location and the set of task sites, or any combination thereof.

4. The system of claim 1, wherein generating the travel route comprises:
and
calculating respective regional average speeds between the starting location, the first task site, and the second task site based on the previously cached travel times; and
generating the travel route based on the calculated regional average speeds.

5. The system of claim 1, wherein generating the travel route comprises:
calculating a regional average speed based on the previously cached travel times and corresponding travel distances;
calculating straight line distances between each of the starting location and the set of task sites;
testing multiple possible routes from the starting location and proceeding in series to the first task site and the second task site of the set of task sites using the regional average speed and the straight line distances for every segment of the multiple possible routes; and
identifying the travel route as a shortest route of the multiple possible routes.

6. The system of claim 1, wherein generating the travel route comprises:
sending a request to a third party processing system to determine the travel route.

7. The system of claim 1, wherein the travel route satisfies conditions associated with the set of task sites, wherein the conditions comprise a range of time in which the first task of the set of task sites is to be completed and an order of completing the first task relative to the second task of the set of task sites.

8. A method to determine a travel route between a set of task sites, comprising:
determining a starting location, wherein the starting location comprises a location of a completed task;
receiving a request to compute a travel route between the starting location and a set of task sites, the set of task sites comprising a first task site and a second task site;
searching for previously cached travel times between the starting location and the set of task sites, wherein the previously cached travel times were previously obtained from a request, sent via network communications using an application programming interface, to a third party service to calculate the respective travel times between the starting location, the first task site, and the second task site;
expanding a search for previously cached travel times by truncating a longitude and a latitude for geographical locations associated with the starting location and the set of task sites before searching for the previously cached travel times between the starting location and the set of task sites;
generating the travel route based on a minimization of a total travel time of respective travel times between the starting location and the first task site, between the starting location and the second task site, and between the first task site and the second task site; and
transmitting the travel route to a requestor.

9. The method of claim 8, wherein the completed task comprises a delivery of a component, an acquirement of the component, an installation of a network, a reconfiguration of the network, or any combination thereof.

10. The method of claim 8, wherein the travel route comprises driving instructions between the starting location and the set of task sites, distances between the starting location and the set of task sites, travel times between the starting location and the set of task sites, or any combination thereof.

11. The method of claim 8, wherein generating the travel route comprises:
calculating respective regional average speeds between the starting location, the first task site, and the second task site based on the previously cached travel times; and
generating the travel route based on the calculated regional average speeds.

12. The method of claim 8, wherein generating the travel route comprises:
calculating a regional average speed based on the previously cached travel times and corresponding travel distances;
calculating straight line distances between each of the starting location and the set of task sites;
testing multiple possible routes from the starting location and proceeding in series to the first task site and the second task site of the set of task sites using the regional average speed and the straight line distances for every segment of the multiple possible routes; and
identifying the travel route as a shortest route of the multiple possible routes.

13. The method of claim 8, wherein generating the travel route comprises:
sending a request to a third party processing system to determine the travel route.

14. The method of claim 8, wherein the travel route satisfies conditions associated with the set of task sites, wherein the conditions comprise a range of time in which the first task of the set of task sites is to be completed and an order of completing the first task relative to the second task of the set of task sites.

15. A tangible, non-transitory, machine-readable medium, comprising machine-readable instructions, configured to:
compute an optimized routing sequence from a starting location to a set of corresponding task sites, wherein the starting location comprises a location of a completed task, wherein computing the optimized routing sequence comprises:
searching a cache for travel times between the starting location and the set of corresponding task sites;
determining an optimized route based on minimizing a total time of the travel times between the starting location and the set of corresponding task sites;
computing expanded geographical locations of the starting location and the set of corresponding task sites prior to searching the cache for the travel times; and
transmitting the optimized route to a requestor.

16. The tangible, non-transitory, machine-readable medium of claim 15, wherein computing the optimized routing sequence comprises:
responsive to not finding the travel times within the cache, requesting a third party service to calculate the travel times between the starting location and the set of corresponding task sites.

17. The tangible, non-transitory, machine-readable medium of claim 16, wherein computing the optimized routing sequence comprises:
responsive to unavailability of the third party service, computing distances between the starting location and the set of corresponding task sites, retrieving a predefined estimated average speed, using a prescribed formula to adjust the predefined estimated average speed according to the computed distances, and computing the travel times for the computed distances using the adjusted predefined estimated average speed.

* * * * *